United States Patent
Podilchuk et al.

(10) Patent No.: US 10,290,101 B1
(45) Date of Patent: May 14, 2019

(54) HEAT MAP BASED MEDICAL IMAGE DIAGNOSTIC MECHANISM

(71) Applicants: Christine I. Podilchuk, Warren, NJ (US); Richard Mammone, Warren, NJ (US)

(72) Inventors: Christine I. Podilchuk, Warren, NJ (US); Richard Mammone, Warren, NJ (US)

(73) Assignee: SONAVISTA, INC., Warren, NJ (US)

( * ) Notice: Subject to any disclaimer, the term of this patent is extended or adjusted under 35 U.S.C. 154(b) by 0 days.

(21) Appl. No.: 16/213,177

(22) Filed: Dec. 7, 2018

(51) Int. Cl.
*G06T 7/00* (2017.01)
*G06T 11/00* (2006.01)

(52) U.S. Cl.
CPC .......... *G06T 7/0012* (2013.01); *G06T 11/001* (2013.01); *G06T 2207/20021* (2013.01); *G06T 2207/20081* (2013.01); *G06T 2207/20104* (2013.01); *G06T 2207/30096* (2013.01); *G06T 2210/41* (2013.01)

(58) Field of Classification Search
CPC ................. G06T 7/0012; G06T 11/001; G06T 2207/20021; G06T 2207/20104; G06T 2207/20081; G06T 2207/30096; G06T 2210/41
See application file for complete search history.

(56) References Cited

U.S. PATENT DOCUMENTS

| | | | | |
|---|---|---|---|---|
| 2012/0030553 | A1* | 2/2012 | Delpha ................. | G06F 16/435 715/205 |
| 2015/0242856 | A1* | 8/2015 | Dhurandhar .......... | G06Q 50/01 705/44 |
| 2017/0270346 | A1* | 9/2017 | Ascierto ................... | G06T 7/11 |
| 2017/0273665 | A1* | 9/2017 | Kapoor ................. | A61B 90/39 |
| 2017/0300621 | A1* | 10/2017 | Lee ....................... | G06F 19/321 |

OTHER PUBLICATIONS

Bolei Zhou et al., "Learning Deep Features for Discriminative Localization", Dec. 14, 2015, 10 pages.
Karen Simonyan et al., "Deep Inside Convolutional Networks: Visualising Image Classification Models and Saliency Maps", Apr. 19, 2014, 8 pages.

* cited by examiner

*Primary Examiner* — Qian Yang
(74) *Attorney, Agent, or Firm* — Gearhart Law, LLC

(57) ABSTRACT

A device to provide a heat map based medical image diagnostic mechanism is described. An image analysis application executed by the device receives a medical image from a medical image provider. A region of interest (ROI) is determined or provided by a user. A disease state score including a malignancy score is calculated for the ROI. Next, the ROI is partitioned into sub-regions. Impact values associated with the sub-regions are also determined. The impact values indicate the influence of a sub-region on the disease state score. Furthermore, annotations are determined based on pixel values associated with the sub-region. A heat map of the sub-regions is also generated based on the impact values. The heat map is labeled with the annotations. Next, the heat map is overlaid on the ROI. The medical image is provided with the heat map to the user.

17 Claims, 5 Drawing Sheets

HEAT MAP BASED MEDICAL IMAGE DIAGNOSTIC MECHANISM

CLAIM OF PRIORITY

This application is a non-provisional application and claims no priority to any patent or patent application.

FIELD OF THE EMBODIMENTS

The field of the embodiments relate to a device to provide a heat map based medical diagnostic mechanism. The diagnostic mechanism may overlay a heat map associated with a probability of malignancy or other disease state onto a region of interest in a medical image. The medical image with the heat map may be provided to a user

BACKGROUND OF THE EMBODIMENTS

Information exchanges have changed processes associated with work and personal environments. Automation and improvements in processes have expanded the scope of capabilities offered for personal and business data consumption. With the development of faster and smaller electronics, a variety of devices have integrated into daily lives. A modern device includes components to provide variety of services such as communication, display, imaging, voice, and/or data capture, among others. Abilities of the modern device jump exponentially when networked to other resources that provide previously unimagined number of services associated with medical imaging.

Ultrasound and other medical imaging devices scan biological structures or tissues of a patient to provide images. The scanned images are provided to medical practitioner(s) to aid with diagnosis of illnesses such as cancer. Clarity and quality of scanned image are usually suspect and depend on variety of conditions associated with the patient and a skill of a technician capturing the scanned image. Furthermore, the medical practitioner is also subject to missed diagnosis or false diagnosis associated with the scanned image due to quality of the scanned image and/or human error.

SUMMARY OF THE EMBODIMENTS

The present invention and its embodiments relate to a device to provide a heat map based medical image diagnostic mechanism. In an example scenario, the device may be configured to receive a medical image and a region of interest (ROI) designated within the medical image. The ROI may correspond to a biological structure (for example within a body part of a patient) that may be associated with a disease state such as a malignancy. Furthermore, a disease state score that is correlated with the disease such as a malignancy score associated with the ROI may be determined. The ROI may also be partitioned into sub-regions. Next, impact values associated with the sub-regions may be determined. The impact values may indicate how much impact a sub-region may have on the malignancy score. The impact value may indicate how sensitive the disease state score is to variations in the sub-region pixel values. At least one impact value may be calculated for each sub-region. The impact value may be calculated for sub-regions selected by the operator or automatically for a given pattern of sub-regions. Furthermore, annotations of the sub-regions may be determined based on pixel values in the sub-regions using a disease state prediction model or an additional separate annotation model for each of the modeled sub-regions. A heat map of the sub-regions may also be generated based on the impact values. The heat map may be labelled with the annotations for each sub-region. Next, the heat map may be overlaid on the ROI. The medical image may be provided with the heat map to a user.

In another embodiment of the present invention, a device for providing a heat map based medical image diagnostic mechanism is described. The device may include a memory configured to store instructions associated with an image analysis application. A processor may be coupled to the memory. The processor may execute the instructions associated with the image analysis application. The image analysis application may include an image analysis module. The image analysis module may be configured to receive a medical image and a region of interest (ROI) within the medical image. The ROI may be determined automatically by a computer assisted detection (CADe) module based on an input seed to a CADe module or manually selected an operator. The ROI may next be processed by a computer assisted diagnosis (CADx) module associated with the image analysis module. The CADx module may determine a disease state score including a malignancy score. Next, the ROI may be partitioned into sub-regions. Impact values associated with the sub-regions may also be determined. The impact values may influence the disease state score (such as the malignancy score). Furthermore, annotations may be determined based on pixel values associated with the sub-region. The annotation may include labels associated with a malignant lesion such as spiculated, micro-lobulated, rounded, indistinct, or angular. The annotations may also include labels associated with a benign lesion such as oval, circumscribed, or abrupt interface. A lesion in the ROI may have multiple annotations indicating which sub-regions are suspicious to help the diagnosis process. Next, a heat map of the sub-regions may be generated based on the impact values. The heat map may be labelled with the annotations. A user interface may also be provided to a user. The user interface may overlay the heat map on to the ROI in the medical image. The user interface may also allow the user to interact with the heat map and/or the annotations.

In yet another embodiment of the present invention, a method of providing a heat map based medical image diagnostic mechanism is described. The method includes receiving a medical image and a region of interest (ROI) designated within the medical image. A disease state score including a malignancy score associated with the ROI may also be determined. Next, the ROI may be partitioned into sub-regions. Impact values associated with the sub-regions may also be determined. The impact values may influence the malignancy score. Furthermore, annotations may be determined based on the pixel values associated with the sub-region. The annotation may include labels associated with a malignant lesion such as spiculated, micro-lobulated, rounded, indistinct, or angular. The annotations may also include labels associated with a benign lesion such as oval, circumscribed, or abrupt interface. A lesion in the ROI may have multiple annotations indicating which sub-regions are suspicious to help the diagnosis process. Next, a heat map of the sub-regions may be generated based on the impact values. The heat map may be labelled with the annotations. A user interface may also be provided to a user. The user interface may overlay the heat map on to the ROI in the medical image. The user interface may also allow the user to interact with the heat map and/or the annotations.

It is an object of the embodiments of the present invention to provide a heat map of sub-regions of a ROI in a medical image.

It is an object of the embodiments of the present invention to overlay the heat map on the medical image.

It is an object of the embodiments of the present invention to allow a user to interact with the heat map.

It is an object of the embodiments of the present invention to provide impact values of the sub-regions that influence a malignancy score of the ROI.

These and other features, aspects and advantages of the present invention will become better understood with reference to the following drawings, description and claims.

DESCRIPTION OF THE PREFERRED EMBODIMENTS

Figure 1:
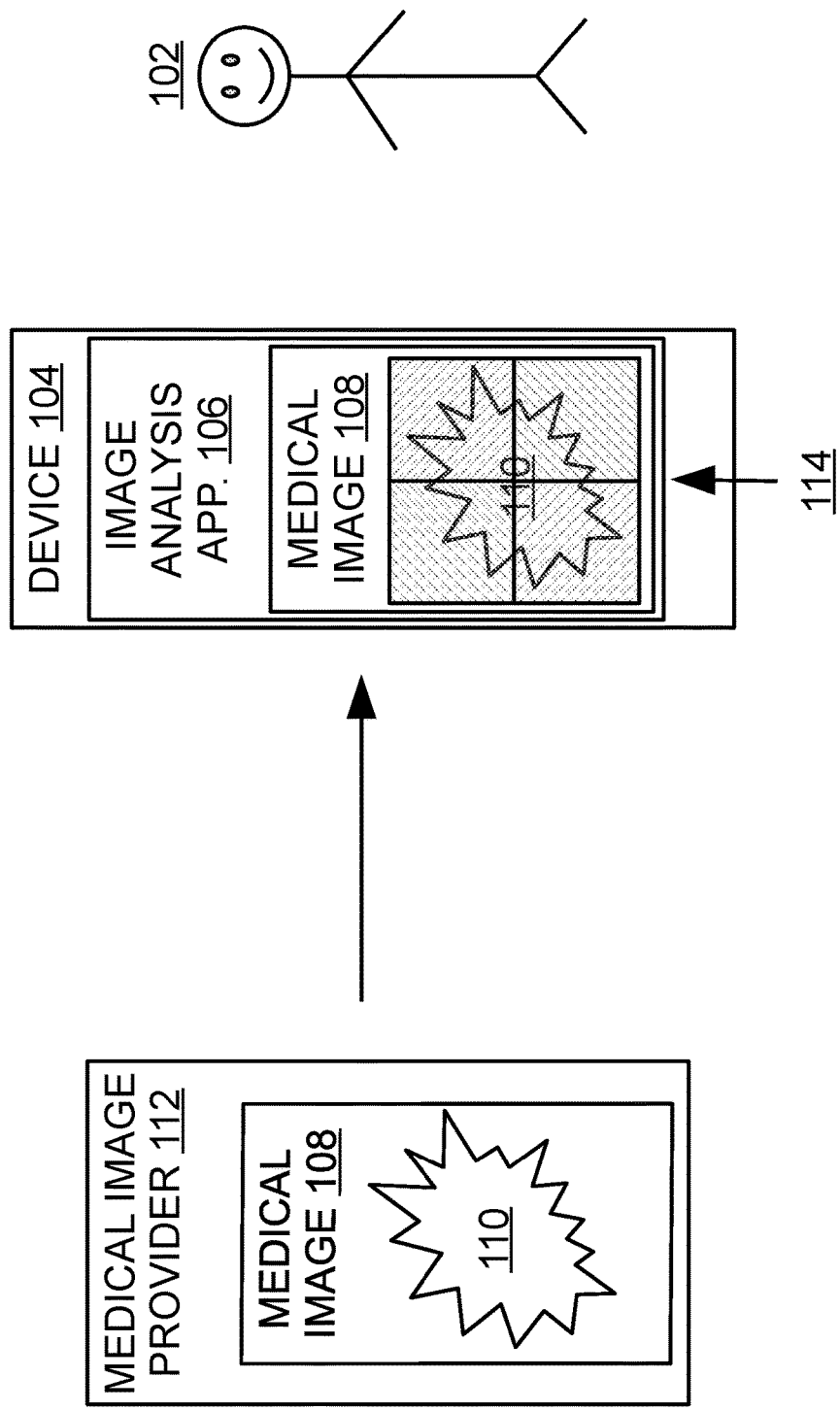
FIG. 1 shows a conceptual diagram illustrating examples of providing a heat map based medical image diagnostic mechanism, according to an embodiment of the invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations may be made thereto.

FIG. 1 shows a conceptual diagram illustrating examples of providing a heat map based medical image diagnostic mechanism. In an example scenario, a device 104 may execute (or provide) an image analysis application 106. The device 104 may include a physical computing device hosting and/or providing features associated with a client application (such as the image analysis application 106). The device 104 may include and/or is part of a smart phone, a tablet based device, a laptop computer, a desktop computer, a physical server, and/or a cluster of servers, among others. The device 104 may also be a node of a network. The network may also include other nodes such as a medical image provider 112, among others. The network may connect nodes with wired and wireless infrastructure.

The device 104 may execute the image analysis application 106. In an example scenario, the image analysis application 106 may receive a medical image 108 from the medical image provider 112. An example of the medical image 108 may include an ultrasound image (or scan). Other examples of the medical image 108 may include a x-ray image, a magnetic resonance imaging (MRI) scan, a computed tomography (CT) scan, and/or a positron emission tomography (PET) scan, among others. The medical image provider 112 may include a medical imaging device/system that captures, manages, and/or presents the medical image 108 to a user 102. The user 102 may include a medical practitioner such as a doctor, a nurse, and/or a technician, a patient, and/or an administrator, among others. The user 102 may use the medical image 108 to diagnose an issue, a malignancy (cancer), and/or other illness associated with a patient.

The medical image 108 may include a region of interest (ROI) 110. The ROI 110 may include a biological structure of a patient. For example, the ROI 110 may include a malignant or a benign lesion. Alternatively, the ROI 110 may represent another structure associated with an organ and/or other body part of the patient.

In an example scenario, the image analysis application 106 may receive the ROI 110 from a computer aided detection (CADe) module. The CADe module may process the medical image 108 with an artificial intelligence mechanism such as deep learning, machine learning, and/or machine vision, among others. A computer assisted diagnosis (CADx) module (associated with the image analysis application 108) may receive the medical image 108 with the ROI 110. Alternatively, the ROI 110 may be selected manually by the user 102. The ROI may next be analyzed by the CADx module to determine a disease state score which may indicate a disease state such as malignancy associated with the ROI 110.

Next, the CADx module may analyze the sub-regions to determine their impact on the disease state score including a malignancy score. An example of the malignancy score may include a value from a range of 0 to 1. A value of approximately 0 may designate the ROI 110 as containing a benign lesion. A value of approximately 1 may designate the ROI 110 as containing a malignant lesion. The malignancy score may be correlated to a disease state such as cancer.

The image analysis application 106 may next partition the ROI 110 into sub-regions. A size of the sub-regions may be determined by the image analysis application 106 based on a size of the ROI 110. For example, the ROI 110 that consumes a large portion of the medical image 108 may be partitioned to a large number of the sub-regions. Alternatively, the ROI 110 that consumes a small portion of the medical image 108 may be partitioned to a small number of the sub-regions. In yet another example scenario, the number of the sub-regions may be determined dynamically based on attributes associated with the medical image 108 such as dimensions, resolution, quality, and clarity.

Impact values associated with the sub-regions may be also determined. The impact values may influence the malignancy score. The sub-regions may also be replaced with pixels that simulate background tissue. A modified disease state score of the modified ROI may be obtained from the CADx module. The impact value may be a function of the change in disease state score for the sub-region for example the normalized change in disease state score due to occluding the subregion may be used as the impact score for that sub-region.

Annotations may also be determined based on pixel values in the sub-region using the same CADx model trained for annotation or a separate annotation model. Pixel values may include an evaluation score assigned to each pixel within the sub-region. The evaluation score may determine a relevance of the pixel to the sub-region in relation to a malignant or benign determination associated with the sub-region and/or the ROI 110. The annotations may provide a malignancy related description associated to each of the sub-regions. As such, a single or a cluster of the sub-regions associated with a malignancy may further be emphasized to the user 102 with the annotations.

The image analysis application 106 may next generate a heat map 114 of the sub-regions based on the impact values. The heat map 114 may also be labelled with the annotations to distinguish a selection of the sub-regions that may be associated with a malignancy or with a benign feature. The heat map 114 may be overlaid on the ROI 110 using a variety of mechanism including direct overlay on the medical image 108 and/or on demand overlay over the ROI 110 of the medical image 108 with mechanisms including augmented reality. Furthermore, the medical image 108 with the heat map 114 may be provided to the user 102. The heat map 114 may aid the user 102 to visualize a malignancy or a benign diagnosis associated with the ROI 110.

Previous example(s) to provide a heat map based medical image diagnosis mechanism are not provided in a limiting sense. Alternatively, the image analysis application 106 may perform operations associated with providing the medical image 108 with the heat map 114 as a desktop application, a workstation application, and/or a server application, among others. The image analysis application 106 may also be a client interface of a server based application.

The user 102 may interact with the image analysis application 106 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the device 104, the image analysis application 106, embodiments are not limited to these components or system configurations and can be implemented with other system configuration employing fewer or additional components.

Figure 2:
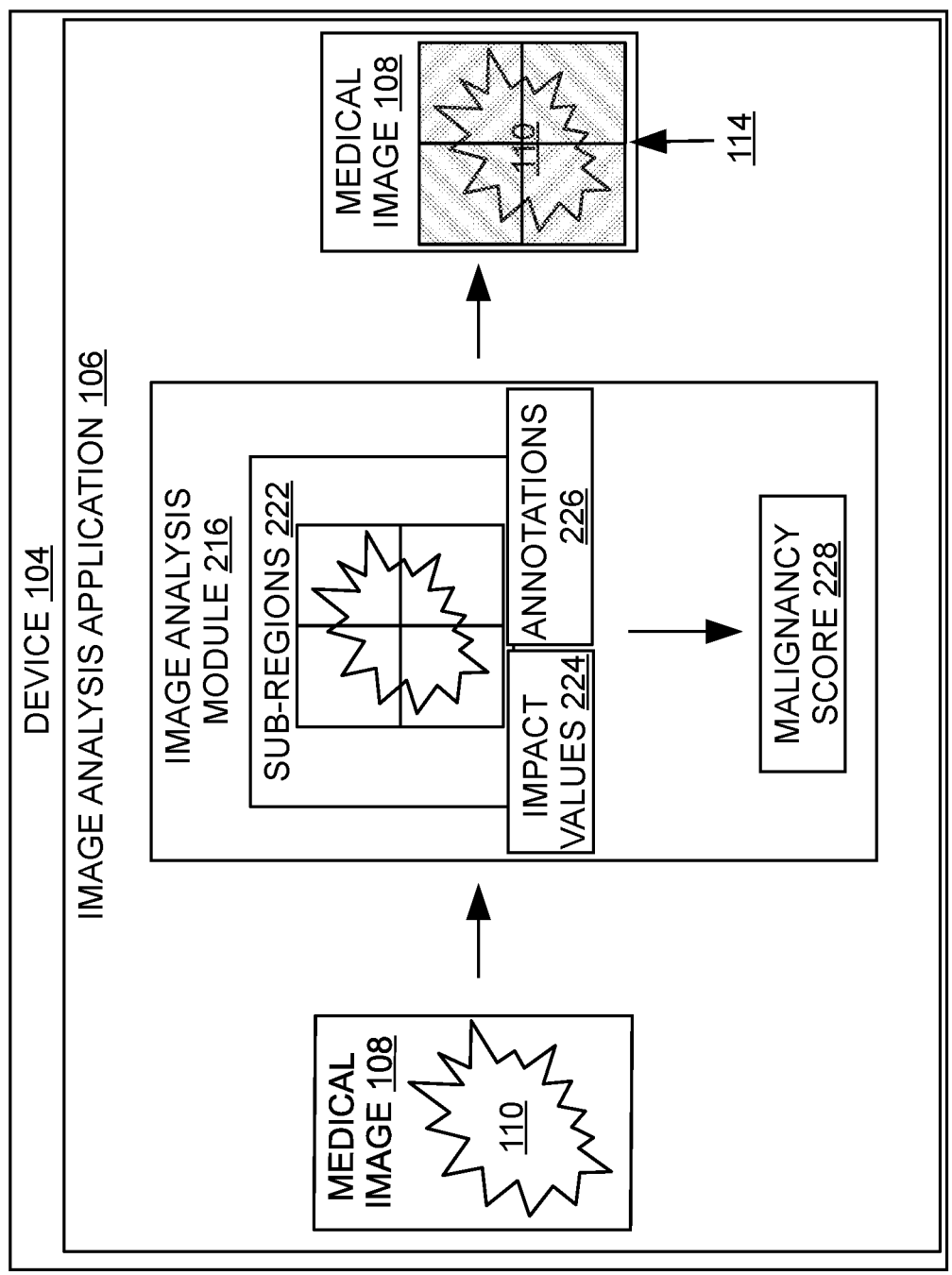
FIG. 2 shows a display diagram illustrating components of an image analysis application generating a heat map for a region of interest (ROI) in a medical image, according to an embodiment of the invention.

FIG. 2 shows a display diagram illustrating components of the image analysis application 106 generating the heat map 114 for the ROI 110 in the medical image 108. The image analysis application 106 may include an image analysis module 216 executed by the device 104. An example of the image analysis module 216 may include the CADe module. Another example of the image analysis module 216 may include the CADx module. Yet another example of the image analysis module 216 may include a heat map module.

In an example scenario, the CADe module may process the medical image 108 to determine the ROI 110. The CADe module may process the medical image 108 with artificial intelligence mechanism(s). By detecting the edges and textures of the ROI 110 learned during training, the ROI 110 may be distinguished from a background and/or other biological structure(s) within the medical image 108.

Alternatively, the user of the image analysis application 106 may be provided with a user interface to select the ROI 110 manually. The user may be provided with controls to draw a region on the medical image 108 that may be designated as the ROI 110. A semi-automatic method can also be employed to select the ROI.

The CADx module may next analyze the ROI 110 with an artificial intelligence based mechanism to determine a disease state score such as a malignancy score 228. Sub-regions of the ROI 110 may determine the malignancy score 228. For example, spiculated or micro-lobulated edge(s) may result in the malignancy score designating the ROI 110 as a malignant lesion. The malignancy score 228 may include a value from a range of 0 to 1. A value of approximately 0 may designate the ROI 110 as a benign tissue. A value of approximately 1 may designate the ROI 110 as a malignant tissue associated with a disease state such as cancer.

The heat map module may sample area(s) of the medical image 108 outside the ROI 110 for a patch of a texture to use as background tissue to substitute into the sub-regions. The change in the malignancy score 228 due to the substitution may be used to calculate the impact value 224 of the sub-region 222. Alternatively, a standard patch of background tissue may be substituted.

Next, the CADx module may partition the ROI 110 into sub-regions 222. The sub-regions may include rectangular partitions of an area encompassed by the ROI 110. Other geometric shapes (such as triangular and/or square shapes) may also be used to partition the ROI 110. A number of the sub-regions 222 may be determined automatically based on attributes associated with the ROI 110 or the medical image 108 such as resolution, size, dimensions, quality, and/or lighting, among others. Alternatively, a user of the image analysis application 106 may provide the number of sub-regions manually through an input action prior to or during the analysis of the medical image 108.

Furthermore, the CADx module may determine impact values 224 associated with the sub-regions 222. The impact values 224 may influence the malignancy score 228. In an example scenario, the malignancy score 228 may be computed from occluding the sub-region and using a measure of the change in malignancy score 228 as the impact value 224. A normalized change in the malignancy score 228 (a change in the malignancy score 228 divided by the original score) could be used to determine the impact value 224. As such, each of the impact values 224 may indicate which sub-regions contributed more or less to the malignancy score 228. For example, a single or a cluster from the sub-regions 222 may include the impact values 224 that significantly impact the malignancy score 228. As such, the single or the cluster of the sub-regions 222 may be designated as relevant in relation to malignancy determination of the ROI 110 based on the malignancy score 228.

Moreover, the CADx module may determine annotations based on the subregion used to determine the impact value 224. The annotations may be used to label each of the sub-regions 222 in relation to a malignancy or a benign determination associated with the sub-regions 222.

Furthermore, the CADx module may generate a heat map 114 of the sub-regions 222 based on the impact values 224. The heat map 114 may include sections that correlate to the sub-regions 222. Each of the sections may be assigned a color. For example, a red color may be assigned to a single or a cluster of the sections correlated to some of the sub-regions 222 (based on the associated impact values 224). In such as a scenario, the impact values 224 may form a significant portion of the malignancy score 228 (associated with a malignant determination of the ROI 110). The red color may alert the user regarding a relevancy of the single or the cluster of the sub-regions 222 to a malignancy determination associated with the ROI 110.

Alternatively, a green color may be assigned to a single or a cluster of the sections correlated to some of the sub-regions 222 (based on the associated impact values 224). In such a scenario, the impact values 224 may form a significant portion of the malignancy score 228 (associated with a benign determination of the ROI 110). The green color may alert the user regarding a relevancy of the single or the cluster of the sub-regions 222 to a benign determination associated with the ROI 110.

The color(s) assigned to the sections (of the heat map 114) may represent the impact values associated with the correlated sub-regions 222. Furthermore, annotations 226 associated with the sub-regions 222 may be used to label correlated sections of the heat map 114. A user interface may also be provided to allow the user to change a color associated with a selected section of the heat map 114 or a selected annotation associated with the sub-regions 222 to help the model learn new examples.

In an example scenario, the CADx module may detect a change to the color associated with the selected section. Next, the impact value 224 associated with the sub-region 222 (correlated with the selected section) may be updated based on the change of the color. For example, a change of the color from green to red may increase the impact value associated with the correlated sub-region 222. Alternatively, a change of the color from red to green may decrease the impact value associated with the correlated sub-region 222. Similarly, the malignancy score 228 may be re-computed based on the updated impact value.

In another example scenario, the CADx module may detect a change to the selected annotation associated with the sub-region 222. The sub-region 222 may be updated based on the change to the selected annotation. For example, a change from a malignant label (the annotation 226) to a benign label may decrease the impact value associated with the sub-region 222. Alternatively, a change from a benign label (the annotation 226) to a malignant label may increase the impact value 224 associated with the sub-region 222. Similarly, the malignancy score may be re-computed based on the updated impact score. An annotation model used to label the sub-regions may also be re-trained based on the change to the annotation associated with the selected region.

In addition, the heat map 114 may include a level of transparency to present features of the ROI 110 below the heat map 114.

Figure 3:
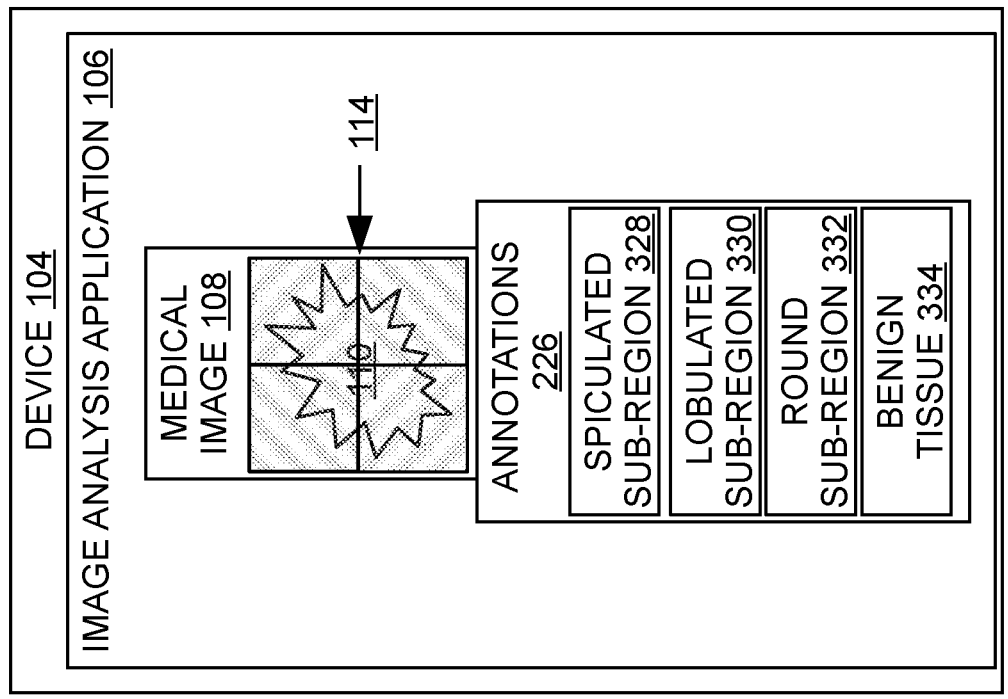
FIG. 3 shows another display diagram illustrating components of user interface allowing a user to interact with a heat map and annotations associated with sub-regions of a ROI of a medical image, according to an embodiment of the invention.

FIG. 3 shows another display diagram illustrating components of a user interface allowing a user to interact with the heat map 114 and the annotations 226 associated with the sub-regions of the ROI 110. The image analysis application 106 (executed by the device 104) may present the medical image 108 with the heat map 114 overlaid on the ROI 110 to a user (such as a medical practitioner or a patient). In addition, the image analysis application 106 may also present the annotations 226 associated with the sub-regions of the ROI 110. The annotations 226 may describe a feature used in BI-RADS, LI-RADS or other standard lexicon used by healthcare providers associated with each of the sub-regions. Examples of the annotations 226 may include a spiculated sub-region 328, a lobulated sub-region 330, a round sub-region 332 and/or annotation(s) indicating a sub-region of benign tissue 334.

In another example scenario, the image analysis application 106 may present the heat map 114 as overlaid on the medical image 108 when the user is viewing the image 108 through an augmented reality display. The user may be allowed to interact, through an augmented reality display, with the heat map 114, the annotations 226, the impact values and/or the malignancy score.

In another example scenario, the annotations 226 may be provided by a deep learning model for each of the sub-regions. The annotations 226 may be trained based on modification(s) and input(s) of operator(s) associated with the medical image 108. The annotations 226 may also be presented as text, sound, or texture associated with the heat map 114.

The example scenarios and schemas in FIGS. 1 through 3 are shown with specific components, data types, and configurations. Embodiments are not limited to systems according to these example configurations. A device to provide a heat map based medical image diagnostic mechanism may be implemented in configurations employing fewer or additional components in applications and user interfaces. Furthermore, the example schema and components shown in FIGS. 1 through 3 and their subcomponents may be implemented in a similar manner with other values using the principles described herein.

Figure 4:
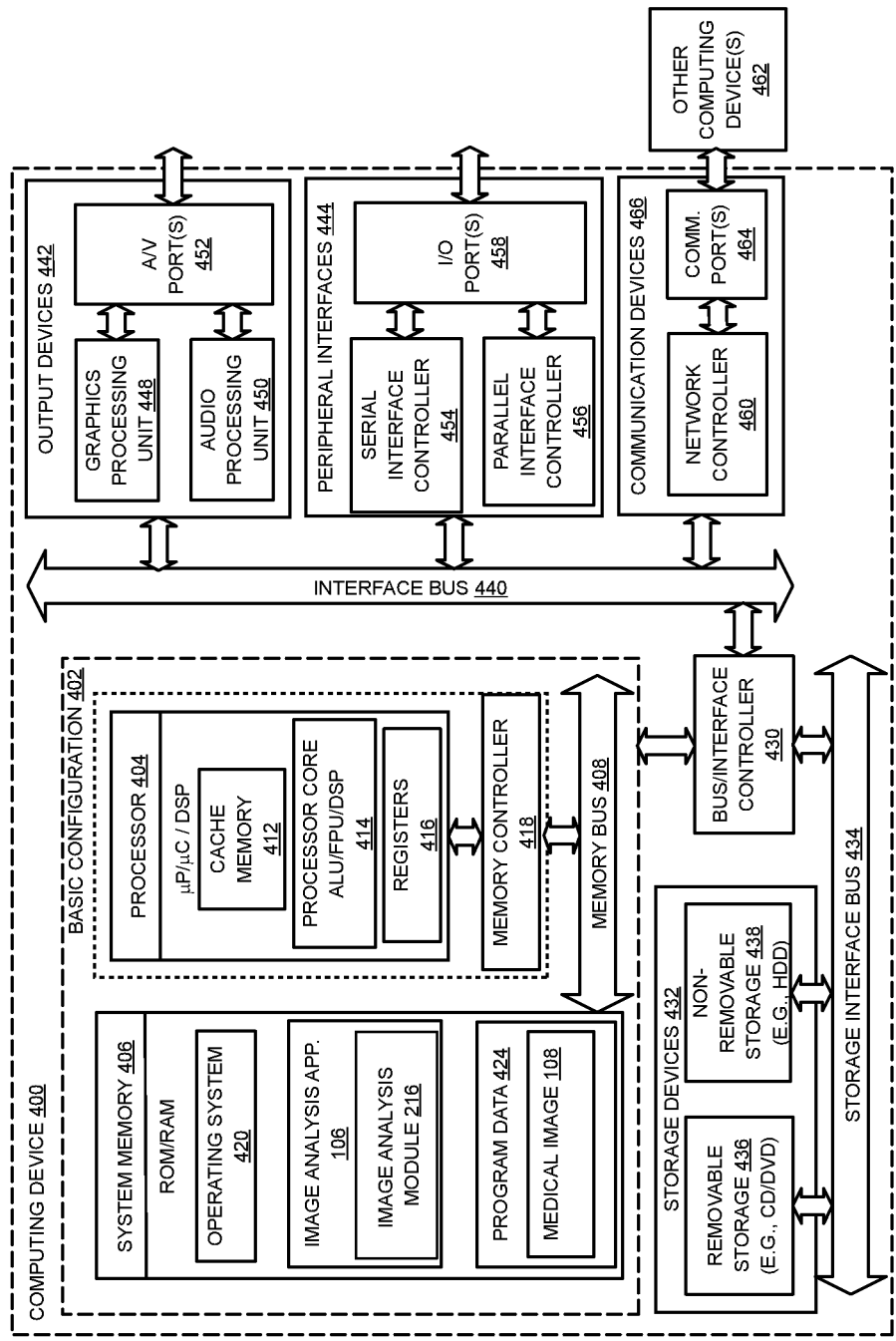
FIG. 4 is a block diagram of an example computing device, which may be used to provide a heat map based medical image diagnostic mechanism.

FIG. 4 is a block diagram of an example computing device, which may be used to provide a heat map based medical diagnostic mechanism, according to embodiments.

For example, computing device 400 may be used as a server, desktop computer, portable computer, smart phone, special purpose computer, or similar device. In a basic configuration 402, the computing device 400 may include one or more processors 404 and a system memory 406. A memory bus 408 may be used for communication between the processor 404 and the system memory 406. The basic configuration 402 may be illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating-point unit (FPU), a digital signal processing core (DSP Core), a graphics processing unit (GPU), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, the image analysis application 106, and a program data 424. The image analysis application 106 may include components such as the image analysis module 216. The image analysis module 216 may execute the instructions and processes associated with the image analysis application 106. In an example scenario, the image analysis module 216 may receive a medical image and the ROI designated within the medical image. Furthermore, a disease state score including a malignancy score associated with the ROI may be determined. The ROI may next be partitioned into sub-regions. Next, impact values associated with the sub-regions may be determined. The impact values may influence the malignancy score. Furthermore, annotations may be determined based on pixel values associated with the sub-regions. A heat map of the sub-regions may also be generated based on the impact values. The sub-regions may be labelled with the annotations. Next, the heat map may be overlaid on the ROI. The medical image may be provided with the heat map to a user.

Input to and output out of the image analysis application 106 may be captured and displayed through a display component that may be integrated to the computing device 400. The display component may include a display screen, and/or a display monitor, among others that may capture an input through a touch/gesture based component such as a digitizer. The program data 424 may also include, among other data, the medical image 108, or the like, as described herein. The medical image 108 may be overlaid with a heat map to aid the user in a medical diagnostic capacity, among other things.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example of the communication device(s) 466 includes a network controller 460, which may be arranged to facilitate communications with one or more other computing devices 462 over a network communication link via one or more communication ports 464. The one or more other computing devices 462 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a specialized server, mainframe, or similar computer, which includes any of the above functions. The computing device 400 may also be implemented as a personal computer including both laptop computer and non-laptop computer configurations. Additionally, the computing device 400 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide a heat map based medical image diagnostic mechanism. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
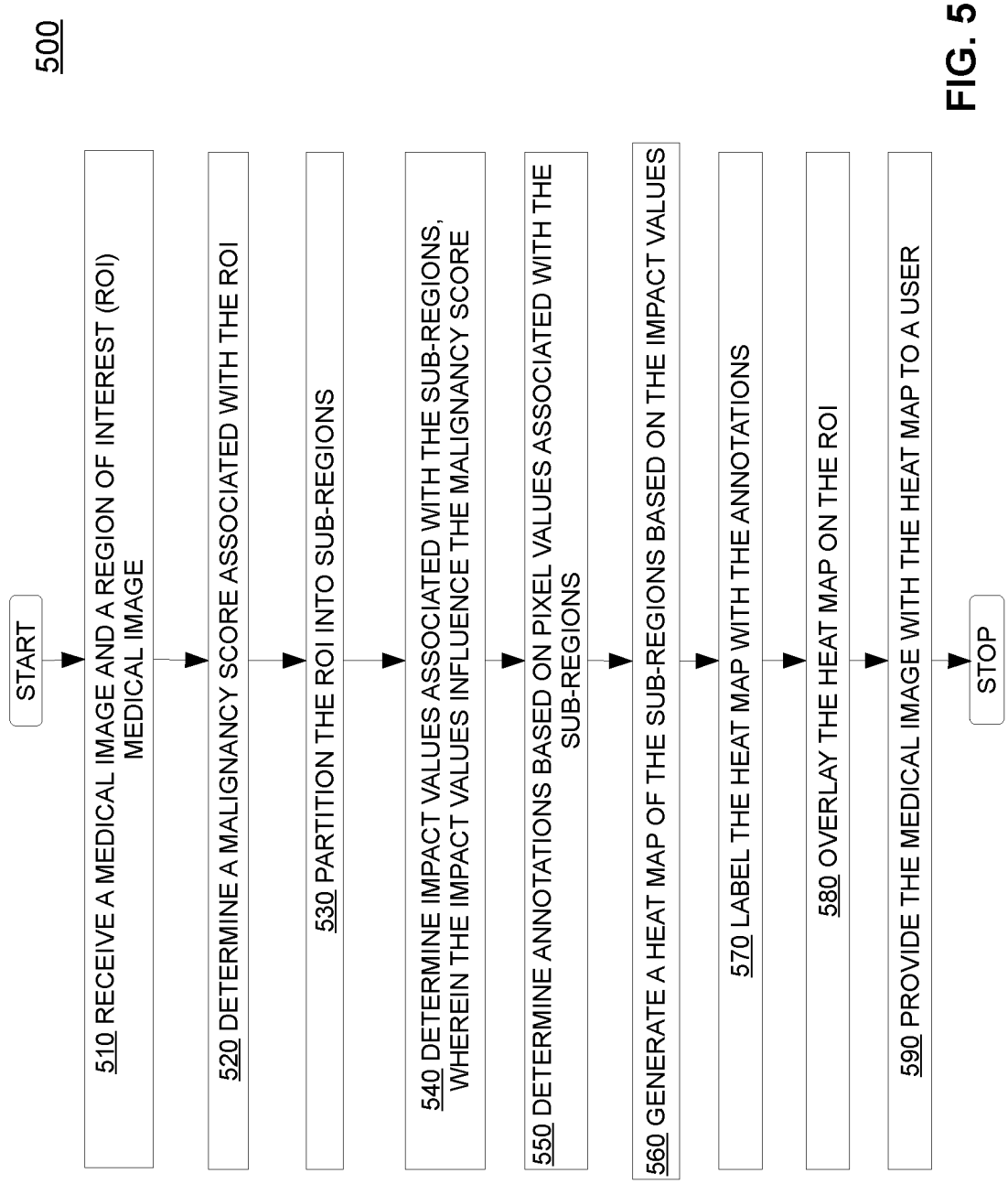
FIG. 5 is a logic flow diagram illustrating a process for providing a heat map based medical image diagnostic mechanism, according to an embodiment of the invention.

FIG. 5 is a logic flow diagram illustrating a process for providing a heat map based medical image diagnostic mechanism. Process 500 may be implemented on a computing device, such as the computing device 400 or another system.

Process 500 begins with operation 510, where an image analysis application receive a medical image and a ROI designated within the medical image. At operation 520, a disease state score including a malignancy score associated with the ROI may be determined. At operation 530, the ROI may be partitioned into sub-regions. Next, at operation 540, impact values associated with the sub-regions may be determined. The impact values may influence the malignancy score.

Furthermore, at operation 550, annotations may be determined based on pixel values associated with the sub-regions. At operation 560, a heat map of the sub-regions may also be generated based on the impact values. At operation 570, the heat map may be labelled with the annotations. Next, at operation 580, the heat map may be overlaid on the ROI. At operation 590, the medical image may be provided with the heat map to a user.

The operations included in process 500 is for illustration purposes. Providing a heat map based medical image diagnostic mechanism may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

A method of providing a heat map based medical image diagnostic mechanism is also described. The method includes receiving a medical image and a ROI designated within the medical image. A disease state score including a malignancy score associated with the ROI may also be determined. Next, the ROI may be partitioned into sub-regions. Impact values associated with the sub-regions may also be determined. The impact values may influence the malignancy score. Furthermore, annotations may be determined based on pixel values of the sub-regions. Each of the annotations may include features associated with a malignant lesion including spiculated, micro-lobulated, rounded, indistinct, or angular and features associated with a benign lesion including oval, circumscribed, or abrupt interface. Next, a heat map of the sub-regions may be generated based on the impact values. The heat map may be labelled with the annotations. A user interface may also be provided to a user. The user interface may overlay the heat map on to the ROI in the medical image. The user interface may also allow the user to interact with the heat map. The user may recommend changes to the annotations and colors based on personal preferences.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A device to provide a heat map based medical image diagnostic mechanism, the device comprising:
   a memory configured to store instructions associated with an image analysis application,
   a processor coupled to the memory, the processor executing the instructions associated with the image analysis application, wherein the image analysis application includes:
      a computer assisted diagnosis module configured to:
         receive a medical image and a region of interest (ROI) within the medical image;
         determine a disease state score including a malignancy score associated with the ROI;
         partition the ROI into sub-regions;
         determine impact values associated with the sub-regions, wherein the impact values influence the malignancy score;
         determine annotations based on the sub-regions from an annotation model trained by an artificial intelligence based mechanism, wherein the annotation model includes a disease state prediction model;
         generate a heat map of the sub-regions based on the impact values;
         label the heat map with the annotations;
         overlay the heat map on the ROI;
         provide the medical image with the heat map to a user;
         detect a user input to change a first annotation or a first color of a first section of the heatmap, wherein the first annotation or the first section is associated with a first sub-region from the sub-regions;
         update the first sub-region based on the change to the first annotation or update a first impact value from the impact values associated with the first sub-region based on the change to the first color of the first section; and
         retrain the annotation model based on the updated first sub-region or the updated first impact value.

2. The device of claim 1, wherein the computer assisted diagnosis module is further configured to:
   modify the ROI by replacing the sub-regions with a pattern of pixels, wherein the pattern of pixels simulate background tissue within the sub-regions;
   determine a modified malignancy score associated with the modified ROI; and
   designate the modified malignancy score as one or more of the impact values associated with one or more of the sub-regions.

3. The device of claim 2, wherein the impact value of each sub-region is computed as a normalized change in the disease state score, wherein a highest probability of a disease state associated with the ROI includes the disease state score equal a value of approximately 1 and a lowest probability of the disease state associated with the ROI includes the disease state score equal a value of approximately 0.

4. The device of claim 1, wherein each of the annotations include a label describing a malignant lesion associated with the ROI, and wherein the label includes spiculated, micro-lobulated, rounded, indistinct, or angular.

5. The device of claim 1, wherein each of the annotations include a label describing a benign lesion associated with the ROI, and wherein the label includes oval, circumscribed, and abrupt interface.

6. The device of claim 1, wherein the heat map includes sections correlated to the sub-regions.

7. The device of claim 6, wherein each of the sections are assigned a color, and wherein the color represents one of the impact values associated with one of the sub-regions.

8. The device of claim 6, wherein the computer assisted diagnosis module is further configured to:
   provide a user interface to allow the user to change a color associated with a selected section of the heat map or a selected annotation associated with one of the sub-regions.

9. The device of claim 1, wherein the computer assisted diagnosis module is further configured to:
   provide a user interface to allow the user to select the ROI.

10. The device of claim 1, wherein the computer assisted diagnosis module is further configured to:
    sample an area of the medical image outside the ROI to obtain a background texture, wherein the texture is used to replace the sub-regions in the modified ROIs to obtain the impact value of the sub-region.

11. The device of claim 1, wherein the computer assisted diagnosis module is further configured to:
    sample one or more areas of the medical image outside the ROI with textures, wherein the sample of the textures are used individually and in combination to replace the sub-region of the ROI to calculate the impact value of the sub-region.

12. A device for providing a heat map based medical image diagnostic mechanism, the device comprising:
    a memory configured to store instructions associated with an image analysis application,
    a processor coupled to the memory, the processor executing the instructions associated with the image analysis application, wherein the image analysis application includes:

a computer assisted diagnosis module configured to:
receive a medical image from a medical image provider and a region of interest (ROI) designated within the medical image;
determine a disease state score including a malignancy score associated with the ROI;
partition the ROI into sub-regions;
determine impact values associated with the sub-regions, wherein the impact values influence the malignancy score;
determine annotations based on the sub-regions from an annotation model trained by an artificial intelligence based mechanism, wherein
each of the annotations include a label describing a malignant lesion or a benign lesion associated with the ROI, wherein
the label includes spiculated, micro-lobulated, rounded, indistinct, angular, oval, circumscribed, or abrupt interface, and wherein
the annotation model includes a disease state prediction model;
generate a heat map of the sub-regions based on the impact values;
label the heat map with the annotations;
provide a user interface to a user, wherein the user interface overlays the heat map on to the ROI in the medical image, and wherein the user interface allows the user to interact with the heat map;
detect a user input to change a first color of a first section of the heatmap, wherein the first section is associated with a first sub-region from the sub-regions;
update a first impact value from the impact values associated with the first sub-region based on the change to the first color of the first section; and
retrain the annotation model based on the updated first impact value.

13. The device of claim 12, wherein the user interface is associated with an augmented reality mechanism or other heads-up display mechanism, wherein the user interface is configured to overlay the heat map on the ROI when the user is viewing the medical image.

14. A method of providing a heat map based medical image diagnostic mechanism, the method comprising:
receiving a medical image and a region of interest (ROI) designated within the medical image;
determine a malignancy score associated with the ROI;
partitioning the ROI into sub-regions;
determining impact values associated with the sub-regions, wherein the impact values influence the malignancy score;
determining annotations based on pixel values associated with the sub-regions from an annotation model trained by an artificial intelligence based mechanism, wherein
the annotations include features associated with a malignant lesion including spiculated, micro-lobulated, rounded, indistinct, or angular and features associated with a benign lesion including oval, circumscribed, or abrupt interface, and wherein
the annotation model includes a disease state prediction model;
generating a heat map of the sub-regions based on the impact values;
labeling the heat map with the annotations;
providing a user interface to a user, wherein the user interface overlays the heat map on to the ROI in the medical image, and wherein the user interface allows the user to interact with the heat map;
detecting a user input to change a first color of a first section of the heatmap, wherein the first section is associated with a first sub-region from the sub-regions;
updating a first impact value from the impact values associated with the first sub-region based on the change to the first color of the first section; and
retraining the annotation model based on the updated first impact value.

15. The method of claim 14, wherein the annotations are provided by a deep learning model for each of the sub-regions.

16. The method of claim 14, wherein the annotations are trained based on one or more modifications and one or more inputs of one or more operators.

17. The method of claim 14, wherein the annotations are presented as text, sound, or texture associated with the heat map.

* * * * *